(12) United States Patent
Ellington et al.

(10) Patent No.: US 7,107,663 B2
(45) Date of Patent: Sep. 19, 2006

(54) EXPANDABLE COUPLING

(75) Inventors: Peter Ellington, Kintore (GB); Iain Cameron Macaulay, Aberdeen (GB)

(73) Assignee: Weatherford/Lamb, Inc., Houston, TX (US)

( * ) Notice: Subject to any disclaimer, the term of this patent is extended or adjusted under 35 U.S.C. 154(b) by 34 days.

(21) Appl. No.: 10/663,351

(22) Filed: Sep. 12, 2003

(65) Prior Publication Data
US 2004/0104575 A1   Jun. 3, 2004

(30) Foreign Application Priority Data
Sep. 13, 2002   (GB)   ................. 0221220.7

(51) Int. Cl.
*B21D 39/00* (2006.01)
(52) U.S. Cl. .............. 29/523; 29/507; 29/456
(58) Field of Classification Search .......... 29/507, 29/523, 456; 285/333, 334, 390, 382
See application file for complete search history.

(56) References Cited

U.S. PATENT DOCUMENTS

| | | |
|---|---|---|
| 1,678,640 A | 7/1928 | Hall |
| 1,820,644 A | 8/1931 | Bach |
| 2,155,370 A | 4/1939 | Hall et al. |
| 2,217,370 A | 10/1940 | Johnston |
| 2,226,804 A | 12/1940 | Carroll |
| 2,341,670 A | 2/1944 | Stinson |
| 2,407,552 A | 9/1946 | Hoesel |
| 2,858,894 A | 11/1958 | Akeyson |
| 2,873,985 A | 1/1959 | Baldwin |
| 3,062,568 A | 11/1962 | Andresen et al. |
| 3,105,556 A | 10/1963 | Raulins |
| 3,353,599 A | 11/1967 | Swift |
| 3,419,079 A | 12/1968 | Current |
| 3,766,991 A | 10/1973 | Brown |
| 3,851,983 A | 12/1974 | MacKenzie |
| 3,855,126 A | 12/1974 | Smith |
| 3,857,450 A | 12/1974 | Guier |
| 3,913,687 A | 10/1975 | Gyongyosi et al. |
| 3,989,284 A | 11/1976 | Blose |
| 4,076,280 A | 2/1978 | Young |
| 4,113,290 A * | 9/1978 | Miida ................. 285/334 |
| 4,449,596 A | 5/1984 | Boyadjieff |
| 4,491,351 A | 1/1985 | Galle, Jr. et al. |
| 4,550,937 A | 11/1985 | Duret |
| 4,591,195 A | 5/1986 | Chelette et al. |
| 4,611,838 A | 9/1986 | Heilmann et al. |
| 4,619,472 A | 10/1986 | Konzo et al. |
| 4,625,796 A | 12/1986 | Boyadjieff |
| 4,659,119 A | 4/1987 | Reimert |
| 4,703,959 A | 11/1987 | Reeves et al. |
| 4,711,474 A | 12/1987 | Patrick |

(Continued)

FOREIGN PATENT DOCUMENTS

EP   0 171 144 A1   2/1986

(Continued)

OTHER PUBLICATIONS

GB 0321504.3 Search Report, dated Feb. 16, 2004.

(Continued)

*Primary Examiner*—David Bochna
(74) *Attorney, Agent, or Firm*—Patterson & Sheridan, L.L.P.

(57) ABSTRACT

An expandable tubular coupling (10) includes first and second thread portions (12,14) each comprising a plurality of inter-engaging teeth (20,22), wherein at least one tooth on the first thread portion (12) engages a corresponding tooth on the second thread portion (14) and the remainder of said inter-engaging teeth (20,22) define respective gaps (32) therebetween.

25 Claims, 4 Drawing Sheets

U.S. PATENT DOCUMENTS

| | | | |
|---|---|---|---|
| 4,712,955 A | 12/1987 | Reece et al. | |
| 4,754,807 A | 7/1988 | Lange | |
| 4,771,829 A | 9/1988 | Sparlin | |
| 4,793,422 A | 12/1988 | Krasner | |
| 4,813,493 A | 3/1989 | Shaw et al. | |
| 4,822,081 A | 4/1989 | Blose | |
| 4,878,546 A | 11/1989 | Shaw et al. | |
| 4,917,409 A | 4/1990 | Reeves | |
| 4,985,975 A | 1/1991 | Austin et al. | |
| 5,015,017 A | 5/1991 | Geary | |
| 5,048,871 A | 9/1991 | Pfieffer | |
| 5,069,761 A | 12/1991 | Krings et al. | |
| 5,181,570 A | 1/1993 | Allwin et al. | |
| 5,251,709 A | 10/1993 | Richardson | |
| 5,339,895 A | 8/1994 | Arterbury et al. | |
| 5,348,095 A | 9/1994 | Worrall et al. | |
| 5,366,012 A | 11/1994 | Lohbeck | |
| 5,388,651 A | 2/1995 | Berry | |
| 5,480,196 A | 1/1996 | Adams, Jr. | |
| 5,520,422 A | 5/1996 | Friedrich et al. | |
| 5,667,011 A | 9/1997 | Gill et al. | |
| 5,782,503 A | 7/1998 | Noel et al. | |
| 5,787,980 A | 8/1998 | Sparlin et al. | |
| 5,855,242 A | 1/1999 | Johnson | |
| 5,901,789 A | 5/1999 | Donnelly et al. | |
| 5,906,398 A | 5/1999 | Larsen et al. | |
| 5,924,745 A | 7/1999 | Campbell | |
| 5,984,568 A | 11/1999 | Lohbeck | |
| 6,012,522 A | 1/2000 | Donnelly et al. | |
| 6,109,349 A | 8/2000 | Simone et al. | |
| 6,158,507 A | 12/2000 | Rouse et al. | |
| 6,158,785 A | 12/2000 | Beaulier et al. | |
| 6,189,619 B1 | 2/2001 | Wyatt et al. | |
| 6,203,766 B1 | 3/2001 | Kawakami et al. | |
| 6,273,634 B1 | 8/2001 | Lohbeck | |
| 6,276,884 B1 | 8/2001 | Bueter | |
| 6,315,040 B1 | 11/2001 | Donnelly | |
| 6,322,109 B1 | 11/2001 | Campbell et al. | |
| 6,409,175 B1 | 6/2002 | Evans et al. | |
| 6,454,013 B1 | 9/2002 | Metcalfe | |
| 6,457,532 B1 | 10/2002 | Simpson | |
| 6,543,816 B1 | 4/2003 | Noel | |
| 6,585,299 B1* | 7/2003 | Quadflieg et al. | 285/333 |
| 6,607,220 B1* | 8/2003 | Sivley, IV | 285/334 |
| 6,685,236 B1 | 2/2004 | Setterberg | |
| 6,712,401 B1* | 3/2004 | Coulon et al. | 285/331 |
| 6,893,057 B1* | 5/2005 | Evans | 285/334 |
| 2002/0070031 A1 | 6/2002 | Voll et al. | |
| 2002/0163192 A1 | 11/2002 | Coulon et al. | |
| 2003/0024708 A1 | 2/2003 | Ring | |
| 2003/0168858 A1 | 9/2003 | Hashem | |
| 2003/0234538 A1 | 12/2003 | Hashem | |
| 2004/0017081 A1 | 1/2004 | Simpson | |

FOREIGN PATENT DOCUMENTS

| | | |
|---|---|---|
| EP | 0 659 975 A2 | 6/1995 |
| EP | 0 803 637 A2 | 10/1997 |
| GB | 2 099 529 A | 12/1982 |
| GB | 2 161 569 A | 7/1985 |
| WO | WO 93/12323 | 6/1993 |
| WO | WO 93/25800 A1 | 12/1993 |
| WO | WO 98/32948 A1 | 7/1995 |
| WO | WO 96/37687 | 12/1995 |
| WO | WO 96/37680 | 11/1996 |
| WO | WO 96/37681 A1 | 11/1996 |
| WO | WO 97/17524 A2 | 5/1997 |
| WO | WO 97/21901 | 6/1997 |
| WO | WO 98/22690 A1 | 5/1998 |
| WO | WO 98/42947 A1 | 10/1998 |
| WO | WO 00/08301 A2 | 2/2000 |
| WO | WO 00/37766 A2 | 6/2000 |

OTHER PUBLICATIONS

U.S. Appl. No. 09/381,508, filed Mar. 20, 1998, Metcalfe.
U.S. Appl. No. 09/762,410, filed Aug. 9, 1999, Metcalfe.
U.S. Appl. No. 10/185,789, filed Jun. 28, 2002, Setterberg.
U.S. Appl. No. 10/313,920, filed Dec. 6, 2002, Maguire.
U.S. Appl. No. 10/443,664, filed May 22, 2003, Ellington.
U.S. Appl. No. 10/664,584, filed Sep. 17, 2003, Evans et al.
U.S. Appl. No. 10/670,133, filed Sep. 26, 2003, Macaulay.
GB 0221220.7 Search Report.
GB 0215668.5 Search Report.
GB 0222321.2 Search Report.
PCT/GB 98/00863 Written Opinion.
GB 0215668.5 Search Report.
"Polytetrafluoroethylene", Encyclopedia Britannica; http://ww.search.eb.com/eb/article?eu=62273 [Accessed Oct. 22, 2002].
"Industrial polymers, major ", Encyclopedia Britannica; http://ww.search.eb.com/eb/article?eu=62273 [Accessed Oct. 22, 2002].

* cited by examiner

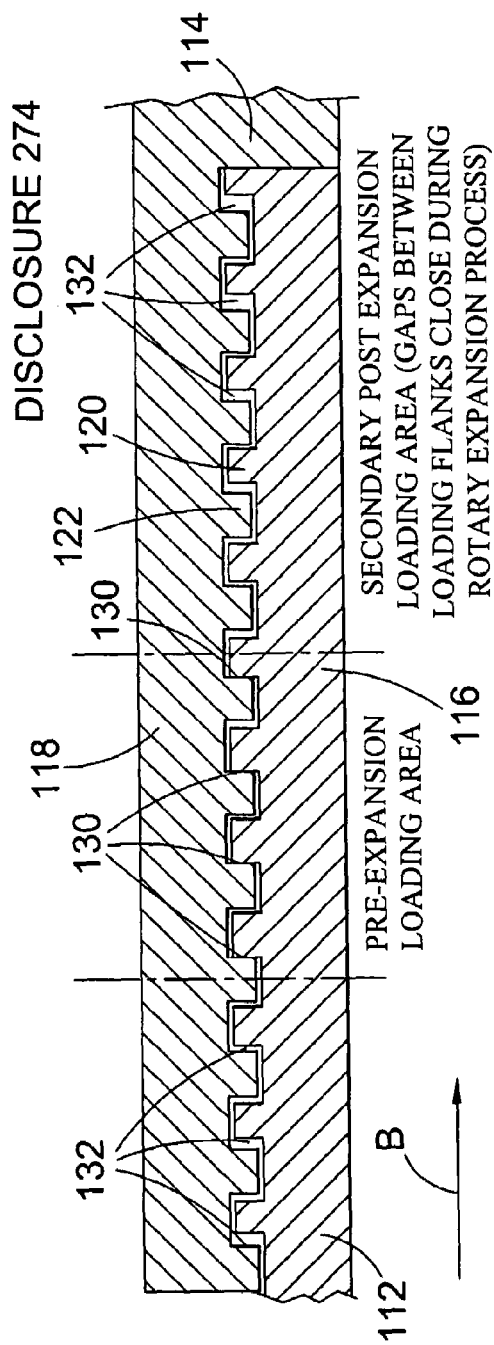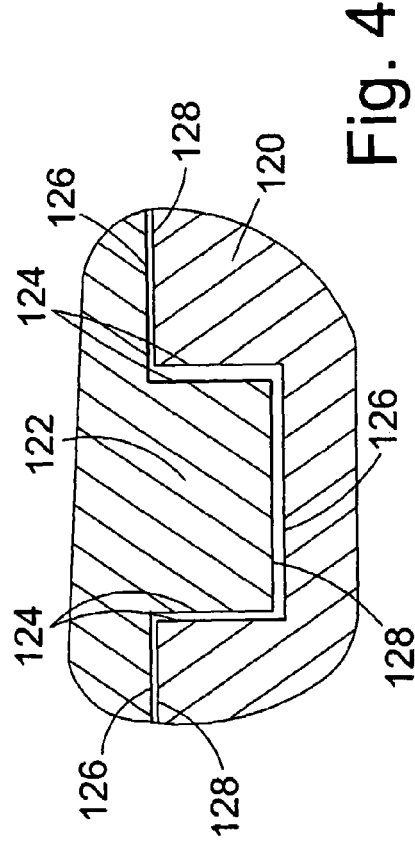

EXPANDABLE COUPLING

BACKGROUND OF THE INVENTION

1. Field of the Invention

The present invention relates to coupling tubulars, and in particular to coupling expandable tubulars, most particularly expandable downhole tubulars.

2. Description of the Related Art

Downhole tubulars, such as bore-lining casing and liners, are typically coupled together by means of threaded connectors, or by providing adjacent ends of tubulars with male and female, or pin and box, threaded ends. For conventional applications, such coupling arrangements are generally satisfactory, providing secure, pressure tight connections. However, where strings of tubulars are to be expanded to describe a larger diameter, it has been found that the integrity of the coupling may be compromised.

This is particularly the case where expansion is achieved using a rotary expansion tool. Such a tool expands the male or pin thread portion by cold working, reducing the wall thickness of the portion resulting in a corresponding increase in circumference and diameter of the portion, which tends to be accompanied by axial elongation of the threaded portion. However, the female or box thread portion is expanded by contact with the expanding male or pin thread portion. This tends to induce axial contraction of the female thread portion. The applicant has found that in a conventional thread this differential expansion tends to produce an adverse effect on the thread integrity. In particular, it has been found that the axial contraction or shrinkage of the box portion is greater than the elongation of the pin portion, and causes the wall sections over the roots of the box portion to neck giving the outer surface of the box portion a rippled appearance. In extreme cases the differential expansion is sufficient to part the connection.

Integrity problems may also occur in couplings which are expanded using alternative expansion methods such as solid cone expansion or hydraulic expansion techniques, which may also cause differential deformation in the different thread parts of the connection. For example, expansion of a tubular using a cone expander may cause the tubular to axially contract as it is radially expanded. However, when the expansion cone is passed through a conventional threaded connection, the male and female, or pin and box thread portions are caused to axially contract at different rates, thus causing adverse deformation due to the interference between the different thread portions. It is this adverse deformation which diminishes the mechanical and hydraulic integrity of the connection.

Specifically, applicant has observed that during solid cone expansion of a conventional connection, the box is initially caused to move or pull away axially with respect to the pin causing interference between adjacent threads resulting in deformation of inter-engaging thread portions, with further expansion causing differential axial shrinkage in both the pin and box, the overall result being an adverse interference in the connection.

It is among objectives of embodiments of the present invention to provide coupling arrangements for tubulars which will seek to retain mechanical and pressure integrity following expansion of the tubulars.

SUMMARY OF THE INVENTION

According to a first aspect of the present invention, there is provided an expandable tubular coupling including first and second thread portions each comprising a plurality of inter-engaging teeth, wherein at least one tooth on the first thread portion engages a corresponding tooth on the second thread portion and the remainder of said inter-engaging teeth define respective gaps therebetween.

According to a second aspect of the present invention there is provided an expandable coupling arrangement for first and second expandable tubulars, the coupling comprising:

a male thread portion on an end of a first tubular; and a female thread portion on an end of a second tubular, the thread portions having flanks, wherein when the male and female thread portions are engaged, at least one flank of the male thread portion abuts a corresponding flank of the female thread portion, and the remaining corresponding flanks of the thread portions define gaps therebetween.

Preferably, the thread portions have crests and roots. It should be understood that the each flank of the thread portions extends and is defined between a respective root and crest.

Thus, when the male and female thread portions are coupled together, engagement between the at least one flank of the male thread portion and the corresponding flank of the female thread portion provides a load point where, for example, the weight of one of the tubulars may be supported by the other tubular. Additionally, engagement between respective flanks of the thread portions may prevent the thread portions from rattling together when the first and second tubulars are coupled or screwed together, which may reduce any vibration or inadvertent loosening of the coupling. As used herein, any flank of the thread portions which provides a load point may be referred to as a load flank.

The invention has application in couplings which are subject to expansion at least partly by a rotary expansion tool. Additionally, the present invention has application in couplings which are subject to expansion at least partly by an expansion mandrel or cone. Furthermore, the present invention may be used where the coupling is to be at least partly expanded using hydraulic pressure techniques such as direct hydraulic pressure or using inflatable hydraulic expansion bladders. It should be appreciated that the present invention may be used where the coupling is to be expanded using any appropriate expansion method or combination of expansion methods commonly used in the art.

Advantageously, once the thread portions are engaged and are subsequently expanded using the required expansion tool or method, the gaps between the corresponding flanks accommodate for relative movement therebetween due to differential expansion or deformation between the male and female thread portions. Thus, due to the presence of the gaps between the flanks before expansion is commenced, the female thread portion is free to axially contract or extend, and the male portion is free to axially contract or extend, depending on the expansion method used, without severe interference between abutting flanks causing severe necking or deformation across the thread roots, or even causing the coupling to separate. Where adjacent flanks are moved to close the gaps and to abut each other, additional load flanks are created, improving the thread engagement, and increasing the sealing integrity between the first and second tubulars.

Preferably, a plurality of flanks of the male thread portion abut corresponding flanks of the female thread portion, thus providing a number of load flanks in the unexpanded coupling. The number of load flanks may be selected as required, for example, in accordance with the weight to be supported by the coupling or the required torque to which the male and female thread portions are to be tightened. Additionally, the number of load flanks may be selected in accordance with the required expansion of the thread portions and additionally or alternatively in accordance with the expansion method to be used.

In one embodiment of the present invention, the abutting flanks are provided at corresponding end portions of the first and second thread portions. Alternatively, abutting flanks are provided in the middle portions of the corresponding male and female thread portions.

Preferably, the gaps between corresponding flanks of the male and female thread portions are provided by employing a variable thread pitch in at least one of the male and female thread portions. The variable thread pitch may be provided on both thread portions and may be achieved by varying the width of the roots of the respective thread along the length thereof. Alternatively, or additionally, the width of the crests of the thread may be varied to provide a variable pitch.

In one embodiment of the present invention, the gaps between corresponding flanks of the male and female thread portions are provided in the central region of the thread portions. Alternatively, the gaps are provided in the end region of the thread portions.

In one embodiment of the present invention it is preferred that the abutting flanks of the thread portions are located in the middle region thereof, as noted above, and the gaps defined between corresponding flanks located in the region of the ends of the thread portions, on either side of the abutting flanks. This particular arrangement is preferred as it provides improved stress and load distribution across the coupling and also optimally maintains sealing integrity once the coupling has been expanded. Additionally, providing the gaps between flanks on either side of the load flanks prior to expansion assists in maintaining the coupling after expansion as any tendency for the interference between the load flanks to cause the coupling to part during expansion will be retained locally, that is, in the middle region of the thread portions.

Conveniently, a deformable sealing material may be provided in the gaps between corresponding flanks of the male and female thread portions. The sealing material may be energised when the coupling is expanded. For example, the sealing material may be compressed between adjacent flanks during expansion of the coupling.

The material properties of the male and female thread portions may be selected to facilitate, improve or control the relative movement between corresponding flanks during expansion.

Where the coupling is to be expanded using a rotary expansion tool, the thread portions preferably define a thread which is cut in an opposite direction to the intended direction of rotary expansion of the coupling, such that any torque applied to or below the coupling by the rotating expander tool will tend to tighten the coupling.

The male and female thread portions may be of a dove-tail thread profile. Alternatively, the thread portions may be of a square, tapered or round thread profile. It should be noted, however, that the thread portions of the coupling arrangement of the present invention may be of any suitable profile as would readily be selected by a person of skill in the art.

The thread portions may be axially parallel, tapered or stepped.

Conveniently, the male thread portion is a pin connector and the female thread portion is a box connector.

Preferably, the first tubular has a leading end portion or nose adapted to be radially constrained by the second tubular. For example, the second tubular may define an undercut slot, recess or groove in which the nose is received. This prevents the nose from separating from the second tubular, and in particular from encroaching into the internal diameter of the coupling following expansion, as might otherwise occur due to end effects, where the free end or nose tends to radially contract more than adjacent portions of the tubular. Alternatively, or in addition, the groove may extend axially and be dimensioned to accommodate axial extension of the first tubular relative to the second tubular. The groove may accommodate a deformable sealing material, such as an elastomer, in particular an elastomeric o-ring or the like which will be energised by relative axial extension of the male thread. In one embodiment, the free end of the first tubular member is not threaded, to facilitate axial movement of the nose relative to the second tubular, and thus to energise, or further energise, the deformable seal, where provided. Preferably, the groove features a rounded recess angle, to prevent stress concentration and to alleviate stress-induced cracking upon extension.

Preferably, the first tubular comprises at least one sealing member for sealing engagement with an opposing surface of the second tubular, most preferably for sealing engagement with an opposing surface adjacent a free end of the second tubular. Conveniently, the sealing engagement is provided with a surface spaced sufficiently from the free end of the unexpanded second tubular to accommodate axial shrinkage of the tubular following expansion. The end effect of the expanded free end also serves to energise the sealing member. Most preferably, the sealing member is in the form of an elastomer. At least two axially spaced elastomers may be provided. The sealing members may be located in appropriate grooves in the first tubular.

Conveniently, where a sealing element is used in any portion or location of the coupling according to the present invention, the element may be manufactured from a swelling elastomer. Conveniently, the swelling elastomer may be caused to swell upon contact with a substance such as a hydrocarbon or water or the like. Thus, if a fluid path exists in the coupling after expansion resulting in leakage, the sealing element may be activated to swell by the particular fluid leaking from the coupling, to restore or provide a substantially fluid tight coupling.

According to a third aspect of the present invention there is provided a method of providing an expanded tubular coupling, said method comprising the steps of:

providing a first tubular including a male thread portion on an end thereof, and a second tubular including a female thread portion on an end thereof, the thread portions having flanks;

engaging the male and female threaded portions to form a tubular coupling, wherein at least one flank of the male thread portion abuts a corresponding flank of the female thread portion, and the remaining corresponding flanks of the thread portions define gaps therebetween; and expanding the tubular coupling, whereby relative axial movement between corresponding flanks during expansion of the coupling is accommodated by the gaps.

Advantageously, the tubular coupling may be expanded using a rotary expansion tool, said rotary expansion tool causing the male thread portion to axially extend and the female thread portion to axially contract.

Alternatively, the tubular coupling may be expanded using a cone expansion tool, said cone expansion tool causing the male thread portion and the female thread portion to axially contract at different rates.

Any suitable expansion tool or technique or combination thereof commonly used in the art may be employed to expand the coupling to a larger second diameter.

BRIEF DESCRIPTION OF THE DRAWINGS

These and other aspects of the present invention will now be described, by way of example only, with reference to the accompanying drawings, in which:

FIG. 3 is a sectional drawing of a tubular coupling in accordance with an alternative embodiment of the present invention;

FIG. 4 is an enlarged view of a portion of a tubular coupling of FIG. 3; and

DETAILED DESCRIPTION OF THE PREFERRED EMBODIMENT

Figure 1:
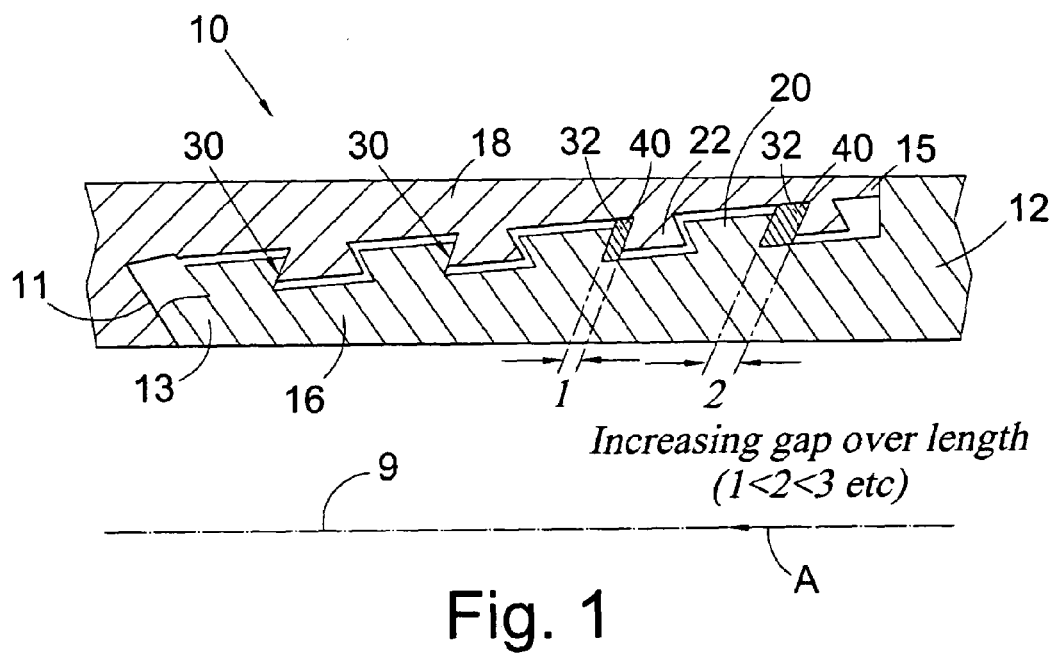
FIG. 1 is a sectional drawing of a tubular coupling in accordance with an embodiment of the present invention.

Reference is first made to FIG. 1 of the drawings in which there is shown a sectional view of a portion of a tubular threaded coupling 10 connecting the ends of first and second downhole tubulars 12, 14. The end of the first tubular 12 features a male threaded portion 16, or a pin connection, while the adjacent end of the second tubular 14 features a corresponding female threaded portion 18, or box connection. The threaded portions 16, 18 in this embodiment are tapered with respect to the longitudinal axis 9 of the coupled tubulars 12, 14. The threaded portions 16, 18 each comprise a plurality of inter-engaging teeth 20, 22, and as more clearly shown in FIG. 2, the teeth 20, 22 of the threaded portions define flanks 24, roots 26 and crests 28.

Figure 2:
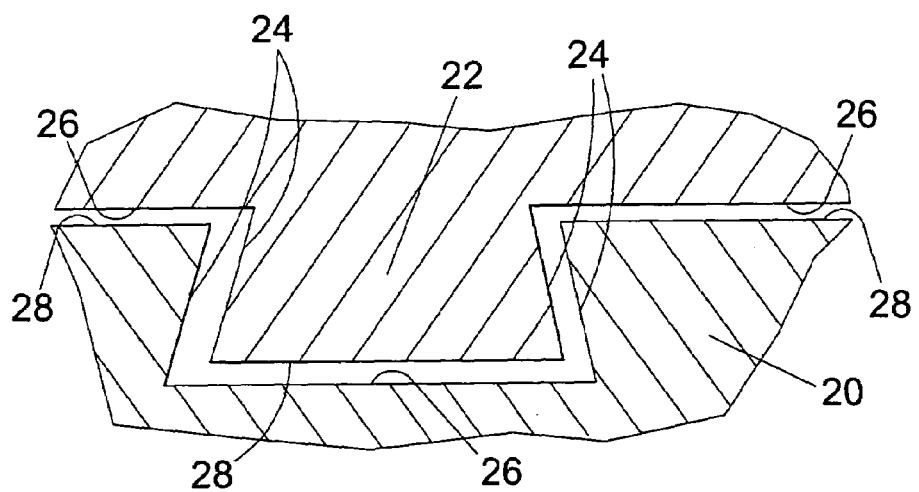
FIG. 2 is an enlarged view of a portion of the tubular coupling of FIG. 1.

In the embodiment shown in FIGS. 1 and 2 the thread teeth 20, 22 have a dovetail profile, that is, the flanks 24 of each tooth 20, 22 are inclined at an angle, that is non-perpendicular, relative to the adjacent roots 26 and crests 24.

Referring again to FIG. 1, some of the flanks 24 of adjacent teeth 20, 22, where the leading end portion of the pin 16 engages the box 18, are in contact in order to provide a load point where, for example, the weight of one of the tubulars 12, 14 may be supported by the other tubular. The point of contact creates load flanks, which are indicated in FIG. 1 by reference numeral 30. In general, any flank 24 of the thread portions 16,18 which provides a load point may be referred to as a load flank. The remainder of the teeth 20, 22 in the unexpanded coupling 10 are not in contact with each other and thus define gaps 32 therebetween.

By providing at least one load flank when the male and female thread portions 16, 18 are initially engaged assists in preventing the thread portions 16, 18 from rattling together, which may reduce any vibration or inadvertent loosening of the coupling, and also provides an initial seal between the tubulars 12,14.

The gaps 32 between corresponding flanks 24 of the male and female thread portions 16, 18 are provided by employing a variable thread pitch in both the male and female thread portion 16, 18. In the embodiment shown, the pitch of the male thread portion 16 increases in a direction away from the nose 13 of the first tubular 12, and the pitch of the female thread 18 increases in a direction towards the nose 15 of the second tubular 14. The variable thread pitch is achieved by varying the width of the roots 26 and crests 28 along the length of the thread portions 16,18.

The nose 13 of the first tubular 12 is radially constrained by the second tubular 14 by way of an undercut slot 11 or groove in which the nose 13 is received. This prevents the nose 13 from separating from the second tubular 14, and in particular from encroaching into the internal diameter of the coupling 10 following expansion, as might otherwise occur due to end effects, where the free end or nose tends to radially contract more than adjacent portions of the tubular.

In use, the coupling 10 is made up on surface in the usual manner, that is the ends of the tubulars 12, 14 will be brought together and the first tubular 12 is then rotated relative to the second tubular 14 to make up the threads. In this manner a tubing string will be created, which may then be run into a bore. Once in position in the bore, the tubing string is expanded using, for example, a rotary expansion tool which will be described below with reference to FIG. 5. The rotary expansion tool is run through the string in the direction of arrow A to expand the tubing string to a larger diameter. When the rotary expansion tool encounters a coupling 10, the male threaded portion 16 is expanded by cold working, reducing the wall thickness and resulting in a corresponding increase in the circumference and diameter of the portion, which tends to be accompanied by axial elongation of the male thread portion 16. However, the female thread portion 18 is expanded by contact with the expanding male thread portion 16, which tends to induce axial contraction of the female thread portion 18.

In a conventional thread profile such deformation tends to have an adverse affect on the integrity of the coupling due to severe interference between abutting flanks causing necking across the thread roots, or even causing the coupling to separate. However, in the illustrated coupling 10, the gaps 32 between corresponding flanks 24 accommodate for the differential expansion of the male and female thread portions 16,18. Thus, due to the presence of the gaps 32, the female thread portion 18 is permitted to axially contract, and the male portion 16 is permitted to axially extend, without extreme interference forces being produced between adjacent flanks 24. At least one of the gaps 32 may be closed by adjacent flanks 24 moving to abut each other, such that additional load flanks 30 are created, first and second tubulars 12, 14.

Figure 6:
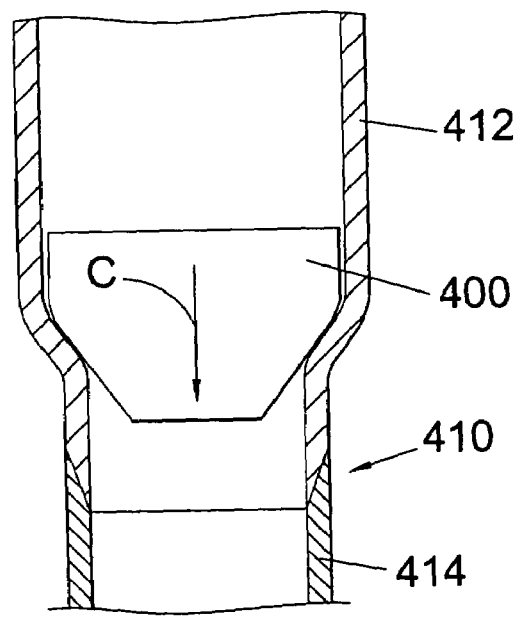

In an alternative embodiment, the tubing string is expanded using an expansion cone, which will be described below with reference to FIG. 6. The expansion cone is run through the string in the direction of arrow A. When the tool encounters a coupling 10, the male threaded portion 16 is expanded by the circumferential force produced by the expansion cone resulting in an axial contraction of the male threaded portion 16. The female thread portion 18 is expanded by the circumferential force exerted by the expansion cone which is transmitted through the male thread portion 16 which will cause the female thread 18 to also axially contract. Due to the nature of the expansion of a coupling 10 using an expansion cone, the male and female thread portions 16 and 18 are caused to axially contract at different rates, which in a conventional coupling would result in adverse interference between abutting flanks 24 causing necking as discussed above. However, the gaps 32 in the coupling 10 accommodate for the differential axial contraction of the thread portions 16, 18.

Reference is now made to FIG. 3 in which there is shown a sectional drawing of a tubular coupling 110 in accordance with an alternative embodiment of the present invention. It should be noted that some features of this embodiment are similar to those described with reference to FIGS. 1 and 2, and in this regard like components share the same reference numerals, preceded by a A1@.

In this embodiment the coupling 110 connects the ends of first and second downhole tubulars 112, 114. The end of the first tubular 112 comprises a male threaded portion 116, or a pin connection, while the adjacent end of the second tubular 114 features a corresponding female threaded portion 118, or a box connection. The male and female threaded portions 116, 118 extend parallel to the longitudinal axis 111 of the coupled tubulars 112, 114. The threaded portions 116, 118 each comprise a plurality of inter-engaging teeth 120, 122, and as shown in FIG. 4, the teeth 120, 122 of the threaded portions define flanks 124, roots 126 and crests 128.

In the embodiment shown in FIGS. 3 and 4 the teeth 120, 122 have a square or rectangular profile, that is, the flanks 124 of each tooth 120, 122 extend substantially perpendicular from the roots and crests 126,128 of the teeth 120, 122.

Referring again primarily to FIG. 3, some of the flanks 124 of adjacent teeth 120, 122 in the middle of the unexpanded threaded portions 116, 118 are in contact in order to provide a load point. The point of contact creates load flanks 130, and in general, any flank 124 of the thread portions 116, 118 which provides a load point may be referred to as a load flank. The remainder of the teeth 120, 122 of the unexpanded coupling 110 are not in contact with each other and thus define gaps 132 therebetween, which gaps 132 being located on either side of the section of the engaging thread portions 116,118 which comprise the load flanks 130.

By providing at least one load flank when the male and female thread portions 116, 118 are engaged, this assists in preventing the thread portions 116, 118 from rattling together, which may reduce any vibration or inadvertent loosening of the coupling, and also provides an initial seal between the tubulars 112,114.

The gaps 132 between corresponding flanks 124 of the male and female thread portions 116, 118 are provided by employing a variable thread pitch in both the male and female thread portion 116,118. In the embodiment shown, the pitch of the thread portions 116, 118 increase in a direction away from the centre portion of the threaded portions 116,118, in the region of the load flanks 130.

Once the coupling 110 has been made up to produce a tubing string as required, the tubing string is run into a bore and a rotary expansion tool is then passed therethrough in the direction of arrow B. As noted above, the male and female thread portions 116, 118 deform in a different manner during rotary expansion such that differential expansion results, wherein the male threaded portion 116 will tend to axially extend and the female threaded portion 118 will tend to axially contract. The problems usually associated with such differential expansion are alleviated due to the presence of the gaps 132 between adjacent flanks 124, which gaps 132 allow the male threaded portion 116 to extend and the female threaded portion 118 to contract, minimising or preventing adverse interference between adjacent flanks 124. Upon rotary expansion, therefore, the gaps 132 may be closed and adjacent flanks 124 may be brought into contact with each other, thus providing additional load flanks 130, improving the integrity of the coupling 110, both in terms of mechanical and fluid considerations.

The coupling 110 may alternatively be expanded using an expansion cone with similar effect to that described above in relation to the coupling 10 of FIGS. 1 and 2.

It should be understood that the embodiments hereinbefore described are merely exemplary of the present invention, and that various modifications may be made thereto without departing from the scope of the invention. For example, the thread portions are not restricted to dovetail or square or rectangular profiles, but may include a rounded profile or any suitable combination of profiles. Additionally, the thread portions are not limited to tapered or straight but nay define a stepped profile, for example. In general, any suitable thread profile may be utilised as would readily be selected by a person of skill in the art. Additionally, any number of load flanks may be provided before the coupling is subjected to expansion. Furthermore, in the embodiments shown, the load flanks are either located at the ends of the threaded portions or in the middle. However, it should be noted that the load flanks may be located in any suitable position, or combination of positions with respect to the threaded portions.

The tubular coupling may include various sealing members located between the tubulars in order to improve the sealing integrity of the coupling, both before and after expansion. For example, a sealing member 40 may be provided in the gaps 32 of the unexpanded coupling 10, as shown in FIG. 1, wherein the sealing members are energised once the coupling 10 is expanded.

Additionally, the nose of each tubular member may be radially restrained in order to provide improved sealing and the like between the tubulars.

Figure 5:
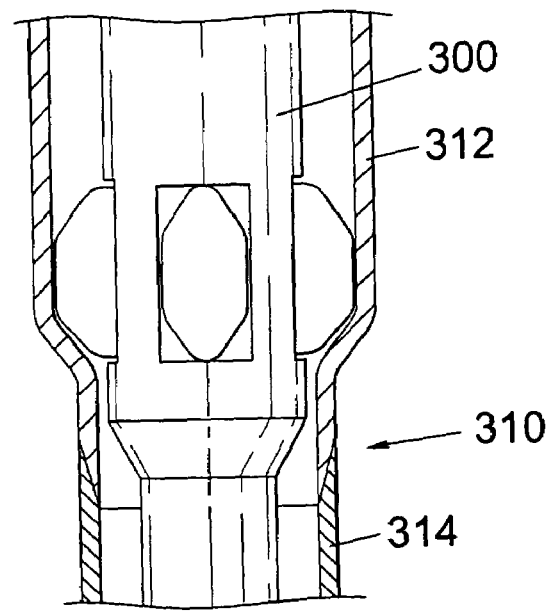
FIGS. 5 to 8 are diagrammatic representations of various expansion methods suitable for use with the present invention.
Figure 7:
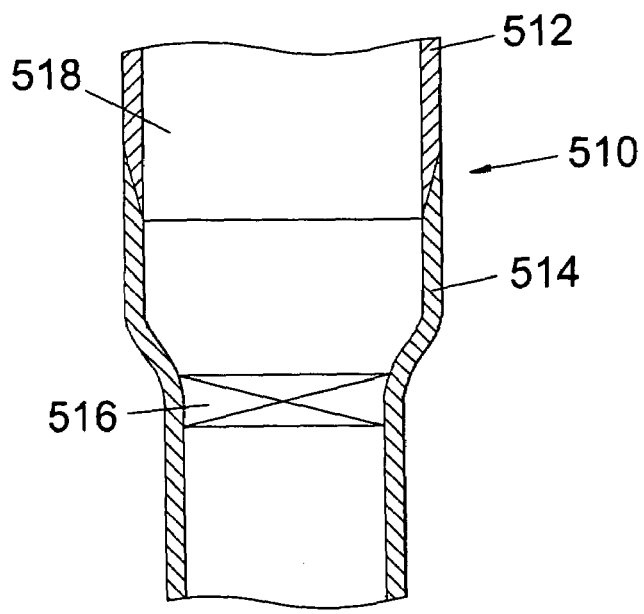
Figure 8:
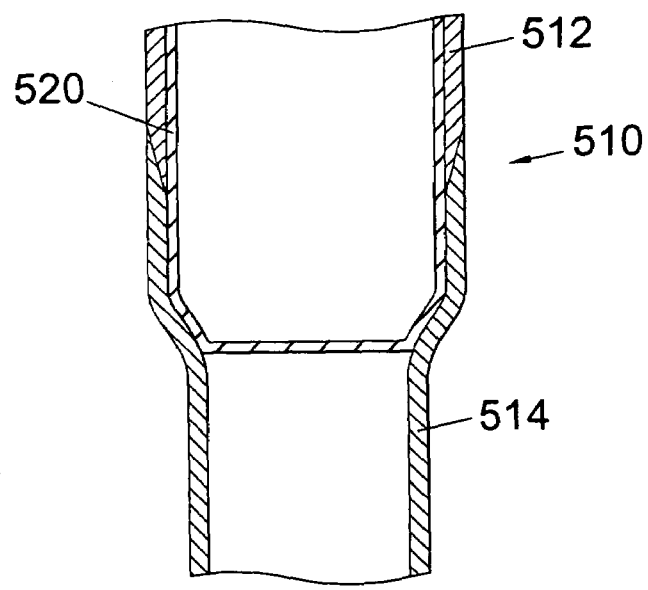

Furthermore, the tubing string may be expanded using any suitable expansion tool or technique. For example, in addition to rotary expansion and cone expansion as noted above, hydraulic expansion may also be used. Various expansion methods suitable for use with the present invention are shown in FIGS. 5 to 8. Referring initially to FIG. 5, a rotary expansion tool 300, such as that disclosed in the International Patent Publication No. WO 00/37766, is shown in use expanding a section of a tubing string comprising a first tubular 312 and a second tubular 314 connected together by an expandable coupling 310 in accordance with an embodiment of the present invention. FIG. 6 shows an expansion cone 400 which is forced through a section of a tubing string in the direction of arrow C, the tubing string comprising first and second tubulars 412, 414 connected by a coupling 410 according to the present invention. FIGS. 7 and 8 show a section of a tubing string having first and second tubulars 512, 514 connected together by coupling 510 according to the present invention during hydraulic expansion. Specifically, the tubing string shown in FIG. 7 is expanded by direct hydraulic pressure by setting packers 516 (only one shown) at spaced locations within the tubing string and then increasing the hydraulic pressure of fluid within the chamber 518 to a level sufficient to radially expand the tubing string. The expansion method shown in FIG. 8 involves placing an inflatable bladder 520 within the tubing string at the required location, and subsequently inflating the bladder 520 by increasing the hydraulic pressure therein, such that the bladder 520 will expand the tubing string.

It should be understood that the coupling arrangement according to the present invention may be expanded by a combination of the tool/methods described in relation to FIGS. 5 to 8, if desired or suitable in a particular situation.

The invention claimed is:

1. A method of providing an expanded tubular coupling, comprising:
    providing a first tubular including a male thread portion on an end thereof and a second tubular including a female thread portion on an end thereof, the thread portions having flanks;

engaging the male and female thread portions to form a tubular coupling wherein each of at least one flank of the male thread portion abuts a respective adjacent flank of the female thread portion, and remaining corresponding flanks of the thread portions define gaps therebetween that have a specifically selected spacing; and expanding the tubular coupling, whereby relative axial movement between corresponding flanks occurs during expansion of the coupling, wherein selecting the spacing is based on an amount of the relative axial movement such that the relative axial movement is accommodated by the gaps.

2. The method of claim 1, wherein the tubular coupling is expanded using a rotary expansion tool, said rotary expansion tool causing the male thread portion to axially extend and the female thread portion to axially contract.

3. The method of claim 1, wherein the tubular coupling is expanded using a cone expansion tool, said cone expansion tool causing the male thread portion and the female thread portion to axially contract at different rates.

4. The method of claim 1, wherein the tubular coupling is expanded using hydraulic pressure.

5. The method of claim 1, wherein expanding the coupling includes securing the connection during expansion by abutting at least some of the remaining corresponding flanks.

6. The method of claim 1, wherein expanding the tubular coupling creates the relative axial movement between corresponding flanks that at least partially closes the gaps.

7. A method of retaining integrity of a tubular coupling after expansion, comprising:

providing male and female thread portions connected together to form the tubular coupling, wherein the thread portions have flanks and define a first set of flanks with corresponding flanks of the male and female thread portions abutting one another and a second set of flanks with corresponding flanks of the male and female thread portions separated from one another prior to expansion; and causing the male thread portion to axially extend and the female thread portion to axially contract by circumferentially expanding the tubular coupling, wherein the integrity is retained due to at least some of the second set of flanks abutting one another.

8. The method of claim 7, wherein the tubular coupling is expanded using a rotary expansion tool.

9. A method of retaining integrity of a tubular coupling after expansion, comprising:

providing male and female thread portions connected together to form the tubular coupling, wherein the thread portions have flanks and define a first set of flanks with corresponding flanks of the male and female thread portions abutting one another and a second set of flanks with corresponding flanks of the male and female thread portions separated from one another by gaps prior to expansion; and creating relative axial movement between corresponding flanks by circumferentially expanding the tubular coupling, wherein the relative axial movement at least partially closes the gaps and at least partial closing of the gaps occurs without substantially increasing interference forces produced between respective adjacent flanks in order to retain the integrity.

10. The method of claim 9, wherein creating relative axial movement energizes a deformable sealing material provided in at least some of the gaps.

11. The method of claim 9, further comprising providing a leading end portion extending from the male thread portion, wherein the leading end portion is constrained in a radial direction at the tubular coupling.

12. The method of claim 11, further comprising providing an undercut groove in a portion of the tubular coupling having the female thread portion, wherein the undercut groove receives the leading end portion.

13. The method of claim 9, wherein creating relative axial movement includes securing the connection during expansion by abutting at least some of the second set of flanks.

14. The method of claim 9, wherein expanding the tubular coupling includes operating a rotary expansion tool, wherein the rotary expansion tool causes the male thread portion to axially extend and the female thread portion to axially contract during expanding.

15. The method of claim 9, wherein expanding the tubular coupling includes operating a cone expansion tool, wherein the cone expansion tool causes the male thread portion and the female thread portion to axially contract at different rates during expanding.

16. The method of claim 9, wherein expanding the tubular coupling is via hydraulic pressure.

17. The method of claim 9, wherein the first set of flanks is disposed in a central region between end regions of the male and female thread portions and the second set of flanks of the thread portions is disposed in the end regions.

18. The method of claim 9, wherein the gaps between corresponding flanks of the male and female thread portions are provided by a variable thread pitch in at least one of the male and female thread portions.

19. The method of claim 18, wherein the variable thread pitch is provided on both thread portions.

20. The method of claim 18, wherein the thread portions include roots and the variable thread pitch is achieved by varying the width of the roots of the respective thread along the length thereof.

21. The method of claim 18, wherein the thread portions include crests and the variable thread pitch is achieved by varying the width of the crests of the respective thread along the length thereof.

22. The method of claim 9, wherein the thread portions define a thread which is cut in an opposite direction to a direction of rotary expansion during expanding the tubular coupling.

23. The method of claim 9, wherein the male and female thread portions are of a dove-tail thread profile.

24. The method of claim 9, wherein the male and female thread portions are of a square profile.

25. The method of claim 9, wherein the thread portions are axially parallel.

* * * * *